(12) United States Patent
Aleshkin et al.

(10) Patent No.: US 11,640,616 B2
(45) Date of Patent: May 2, 2023

(54) SYSTEM AND METHOD OF COUNTING VOTES IN AN ELECTRONIC VOTING SYSTEM

(71) Applicant: AO Kaspersky Lab, Moscow (RU)

(72) Inventors: Roman V. Aleshkin, Moscow (RU);
Maxim V. Riveiro, Moscow (RU);
Artem G. Nagorny, Moscow (RU);
Evgeny N. Barkov, Moscow (RU);
Mikhail D. Kudryavtsev, Moscow (RU)

(73) Assignee: AO Kaspersky Lab, Moscow (RU)

( * ) Notice: Subject to any disclaimer, the term of this patent is extended or adjusted under 35 U.S.C. 154(b) by 202 days.

(21) Appl. No.: 17/072,122

(22) Filed: Oct. 16, 2020

(65) Prior Publication Data
US 2021/0264443 A1 Aug. 26, 2021

(30) Foreign Application Priority Data

Feb. 26, 2020 (RU) .......................... RU2020108170

(51) Int. Cl.
*G06Q 30/00* (2023.01)
*G06Q 10/10* (2023.01)
*G06Q 50/26* (2012.01)
*H04L 9/32* (2006.01)
*G06K 19/06* (2006.01)
(Continued)

(52) U.S. Cl.
CPC ..... *G06Q 30/0185* (2013.01); *G06F 16/2379* (2019.01); *G06K 19/06028* (2013.01); *G06K 19/06037* (2013.01); *G06K 19/0723* (2013.01); *G06Q 10/10* (2013.01); *G06Q 50/265* (2013.01); *H04L 9/3213* (2013.01); *G06Q 2220/00* (2013.01); *G06Q 2230/00* (2013.01)

(58) Field of Classification Search
CPC .. G06Q 30/0185; G06Q 10/10; G06Q 50/265; G06Q 2230/00; G06Q 50/26; G06K 19/06037; G06K 19/06028; G06K 19/0723; H04L 9/3213; H04L 2209/463; G07C 13/00
USPC ........................................... 705/12; 235/386
See application file for complete search history.

(56) References Cited

U.S. PATENT DOCUMENTS 10,109,129 B2 10/2018 Joyce et al.
2001/0034640 A1* 10/2001 Chaum .................. G07C 13/00
705/12
(Continued)

FOREIGN PATENT DOCUMENTS

WO 2019033011 A1 2/2019

*Primary Examiner* — Edwyn Labaze
(74) *Attorney, Agent, or Firm* — ArentFox Schiff LLP; Michael Fainberg (57) ABSTRACT

Disclosed herein are systems and methods for counting a ballot in an electronic voting system. In one aspect, an exemplary method comprises, generating, by a token generator of the system, a number of tokens, wherein every token unambiguously identify actions of a user during an electronic voting, when the user is identified and authenticated successfully, enabling the user to select a token from the number of tokens, activating, by a ballot activator of the system, a ballot for the user, wherein activating includes generating the ballot, unambiguously relating the token selected by the user to the ballot, and enabling the user to access the ballot, and counting, by a ballot counter of the system, the ballot filled out by the user.

20 Claims, 5 Drawing Sheets

(51) Int. Cl.
  *G06K 19/07* (2006.01)
  *G06F 16/23* (2019.01)
  *G06Q 30/018* (2023.01)

(56) References Cited

U.S. PATENT DOCUMENTS

| | | | |
|---|---|---|---|
| 2003/0094489 A1* | 5/2003 | Wald | G07C 13/00 |
| | | | 235/386 |
| 2005/0284935 A1* | 12/2005 | Sinha | G07C 13/00 |
| | | | 235/386 |
| 2008/0172333 A1 | 7/2008 | Neff | |
| 2008/0173715 A1 | 7/2008 | Liberman | |
| 2009/0032591 A1 | 2/2009 | Cordery et al. | |
| 2009/0072032 A1 | 3/2009 | Cardone et al. | |
| 2009/0160174 A1* | 6/2009 | Haas | G07C 13/00 |
| | | | 283/5 |
| 2014/0012635 A1* | 1/2014 | Joyce | G07C 13/00 |
| | | | 705/12 |
| 2018/0264347 A1 | 9/2018 | Tran et al. | |
| 2020/0242229 A1* | 7/2020 | Curran | G06F 21/606 |
| 2022/0172545 A1* | 6/2022 | Zbeda | H04L 9/085 |

* cited by examiner

SYSTEM AND METHOD OF COUNTING VOTES IN AN ELECTRONIC VOTING SYSTEM

CROSS REFERENCE TO RELATED APPLICATIONS

The present application claims priority to Russian Patent Application No. 2020108170 filed on Feb. 26, 2020, the entire content of which is incorporated herein by reference.

FIELD OF TECHNOLOGY

The present disclosure relates to the field of electronic voting, more specifically, to systems and method of for increasing security of information when counting votes that are cast during a voting process and depersonalizing the voter.

BACKGROUND

The widespread use of various computing devices (personal computers, notebooks, tablets, smartphones and so forth), the advent of accessible high-performance servers, the enormous increase in the bandwidth of computer networks and the substantial lowering of the price for network traffic for end users in recent years have given a powerful stimulus to the use of distributed data processing systems by individual users and entire organizations. When distributed data processing systems are utilized, data is produced on certain computing devices, processed on others, and stored on still other devices. At the same time, cloud services are increasingly gaining in popularity, during the use of which the personal computing devices of users are often times employed solely as terminals. For example, online banking systems, hotel room and travel ticket reservation systems, rating systems (systems for producing reviews, for example reviews of films) and so forth may be provided as such cloud services.

In one example, such distributed data processing systems include electronic voting systems—systems in which a voter may vote for a candidate (during an election, for example) or produce a rating review (such as one for a film they have seen, a book they have read, or an item they have purchased) with the aid of their computing device (personal computer, notebook, tablet, mobile telephone, and so forth). Some obvious advantages afforded by an electronic voting system, include ease of voting (all that is needed is the voter's computer with a specialized software preinstalled and access to a computer network, such as the Internet), efficiency (the voter can vote at any time and from any place with access to the computer network), and vote counting accuracy (all votes are counted and kept in a central location, the counting is efficient and automatic, ruling out human error). In addition, electronic voting systems are able to solve the problems of increasing the security of voting (fewer disruptions during elections, such as fake votes, deliberate vote counting mistakes, and so on) and increase the reliability of the voting results.

One can identify two main problems which an electronic voting system should solve effectively:

voter anonymization (in other words, assuring secrecy of the voting, so that during the entire voting process, in every stage thereof, from voter registration to the final vote count at the end of the voting, it would be impossible to determine who each voter has voted for); and enhancing the security of the votes cast by protecting the electronic voting system against vote falsifications.

Voter anonymization is provided by a technology which allows concealment of the identity of the voter and the vote cast by the voter during all stages of the voting.

Protection against vote falsification is provided by a group of technologies which counteract allow various kinds of falsifications to be counteracted. The falsification may include:

counterfeiting of votes (such as stuffing ballot boxes when paper ballots are used, replacing one vote by another, and so forth); ю unlawful interference with the work of the voting observers at voting stations;

counterfeiting of voting records (for example, deliberately entering false data in the final voting results);

deliberate mistakes in vote counts;

and so forth.

At the present time, many technologies exist and are used in electronic voting systems to solve some or all of the above described problems. However, these technologies do not meet the needs of security (i.e., fewer violations during elections) or confidentiality of the votes (ensuring secrecy of voting so that during the entire voting process and at every stage thereof it would not be possible to determine who each voter voted for), and are unable to deal with unauthorized modification of the results of electronic balloting.

Thus, there is a need for a more optimal way of guaranteeing the security of votes and providing an accurate count of the votes when using an electronic voting system.

SUMMARY

Aspects of the disclosure relate to counting votes when using an electronic voting system, more specifically to systems and methods for increasing security of information when counting votes that are cast during a voting process and depersonalizing the voter.

In one exemplary aspect, a method is provided for counting votes in an electronic voting system, the method comprising: generating, by a token generator of the system, a number of tokens, wherein every token unambiguously identify actions of a user during an electronic voting, when the user is identified and authenticated successfully, enabling the user to select a token from the number of tokens, activating, by a ballot activator of the system, a ballot for the user, wherein activating includes generating the ballot, unambiguously relating the token selected by the user to the ballot, and enabling the user to access the ballot, and counting, by a ballot counter of the system, the ballot filled out by the user.

In one aspect, the number of tokens is at least two and exceeds a number of total users.

In one aspect, the method further comprises generating a record of the counted ballot in the electronic voting system.

In one aspect, the actions of the user comprise at least one of: an action for sending a request to receive information about the voting in which the user intends to participate; an action for sending a request to receive a ballot for filling out; an action for filling out a ballot; an action for sending a request to count the ballot after being filled out; an action for confirmation of the ballot as being correctly filled out; and an action for recalling the ballot.

In one aspect, the token is designed only for onetime use in the electronic voting system.

In one aspect, the token comprises at least one of: a QR code; a barcode; a key character sequence; and an RFID tag.

In one aspect, the activation of the ballot is performed based on the user presenting the token selected by the user to the ballot activator.

In one aspect, the activation of the ballot further includes determining voting parameters available for the user, the voting parameters including at least one of: parameters for indicating which votes the user is able to participate in using the token; a list of voting options from which the user is to select a candidate; and a length of time allotted for casting the vote.

In one aspect, the voting parameters are determined based on voting information which include at least: information encrypted in the token; and information saved in the electronic voting system and is related to the token.

In one aspect, the user is able to access the activated ballot based on the user presenting the selected token to an access device.

In one aspect, the user is able to access the activated ballot when a time interval between the activation of the ballot and a time of the access to the activated ballot does not exceed a previously determined threshold.

According to one aspect of the disclosure, a system is provided for counting votes in an electronic voting system, the system comprising a hardware processor configured to: at least one processor of a computing device configured to: generate, by a token generator of the system, a number of tokens, wherein every token unambiguously identify actions of a user during an electronic voting, when the user is identified and authenticated successfully, enables the user to select a token from the number of tokens, activates, by a ballot activator of the system, a ballot for the user, wherein activating includes generating the ballot, unambiguously relating the token selected by the user to the ballot, and enabling the user to access the ballot, and count, by a ballot counter of the system, the ballot filled out by the user.

In one exemplary aspect, a non-transitory computer-readable medium is provided storing a set of instructions thereon for counting votes in an electronic voting system, wherein the set of instructions comprises instructions for: generating, by a token generator of the system, a number of tokens, wherein every token unambiguously identify actions of a user during an electronic voting, when the user is identified and authenticated successfully, enabling the user to select a token from the number of tokens, activating, by a ballot activator of the system, a ballot for the user, wherein activating includes generating the ballot, unambiguously relating the token selected by the user to the ballot, and enabling the user to access the ballot, and counting, by a ballot counter of the system, the ballot filled out by the user.

The method and system of the present disclosure are designed to provide security for information during votes, counting of votes, reporting of votes, etc. and depersonalizing the voting data.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for counting votes in an electronic voting system. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

In one aspect, the present disclosure describes a system for counting votes in an electronic voting system that is implemented on a computing system (e.g., a computer of a means of transportation, etc.), that includes real-world devices, systems, components, and groups of components realized with the use of hardware such as integrated microcircuits (application-specific integrated circuits, ASICs) or field-programmable gate arrays (FPGAs) or, for example, in the form of a combination of software and hardware such as a microprocessor system and set of program instructions, and also on neurosynaptic chips. The functionality of such means of the system may be realized solely by hardware, and also in the form of a combination, where some of the functionality of the system means is realized by software, and some by hardware. In certain aspects, some or all of the components, systems, etc., may be executed on the processor of a general-purpose computer (such as the one shown in FIG. 5). Furthermore, the system components may be realized either within a single computing device or spread out among several interconnected computing devices.

Figure 1:
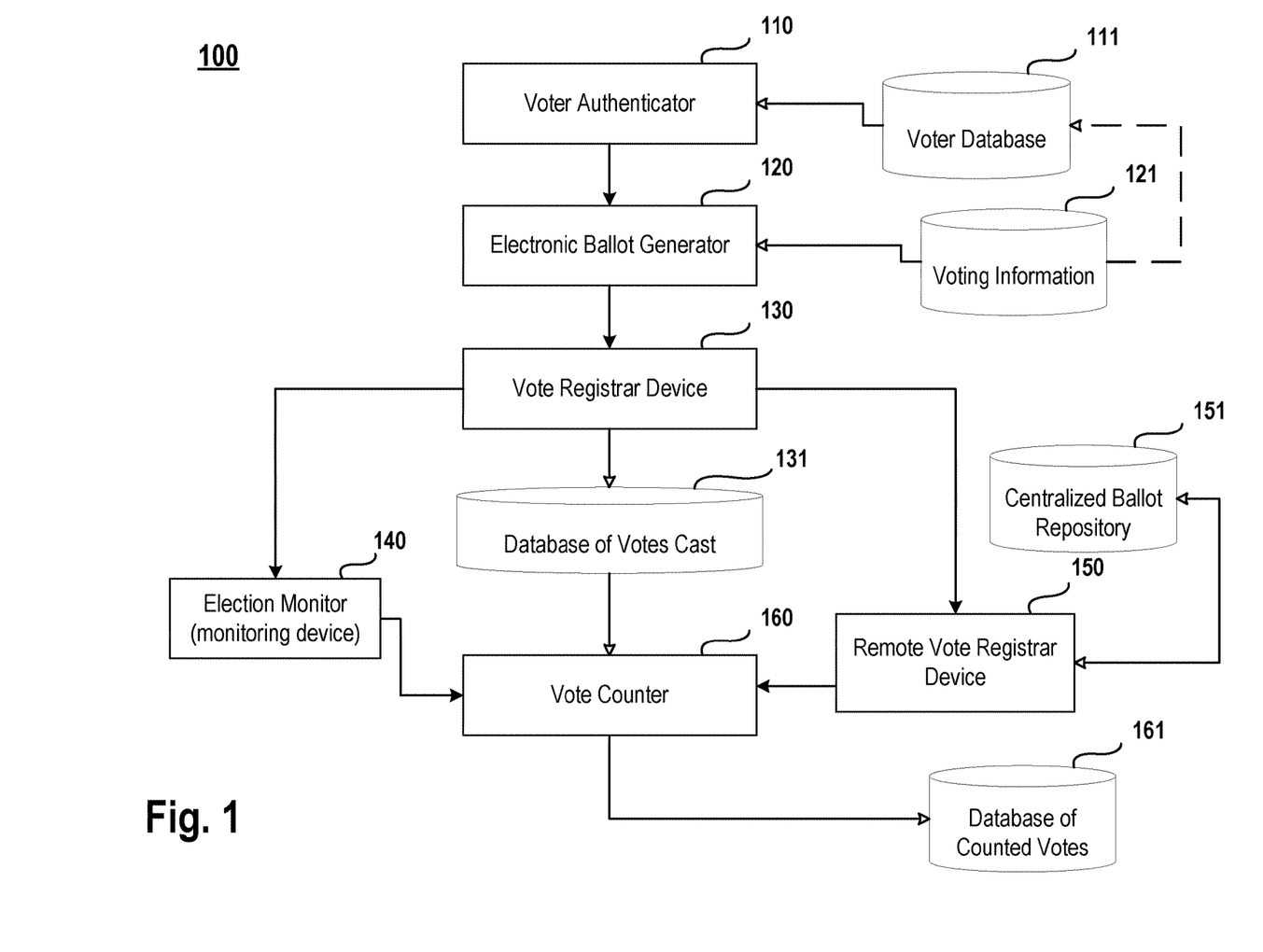
FIG. 1 illustrates a system for casting a vote in an electronic voting system in accordance with aspects of the present disclosure.

FIG. 1 illustrates a system 100 for casting a vote in an electronic voting system in accordance with aspects of the present disclosure. In one aspect, the system 100 comprises a voter authenticator 110, a voter database 111, an electronic ballot generator 120, voting information 121, a vote registrar device 130, a database of votes cast 131, an election monitor 140, a remote vote registrar device 150, a centralized ballot repository 151, a vote counter 160, and a database of counted votes 161. It is noted that the voter authenticator 110, electronic ballot generator 120, the vote registrar device 130, the election monitor 140, the remote vote registrar device 150, and the vote counter 160 comprise: one or more computing devices, components of computing devices, etc. That is, the voter authentication, ballot generation, registration of votes that are cast, election monitoring, and counting of votes cast, etc., are all performed via electronic devices using hardware, software, etc. and not by humans.

In one aspect, the voter authenticator 110 is designed to:
authenticate a voter who is intending to participate in the voting on the basis of data from the voter database 111; and send the data on the voter to the electronic ballot generator 120, in the event of successful authentication of the voter.

In one aspect, the authentication of the voter is done based on at least one of the following methods:

biometric data of the voter; and an electronic identifier of the voter.

For example, prior to the start of the voting (upon arrival at the polling station where corresponding computer equipment is installed for the electronic voting) or upon registration in the service of an electronic voting system the voter undergoes an authentication. In one aspect, the voting may be performed remotely without visiting a polling station If it is possible to vote remotely, the registration involves identification and authorization of the user as a voter, and also providing the user information and software needed to perform the voting. In one aspect, voting remotely is performed using individual computing devices such as personal computers, notebooks, tablets, telephones, and so forth.

As a result of the authentication, the method: determines whether or not an individual (i.e., a person) is entitled to participate in any number of voting processes that are occurring; for an individual who is entitled to vote, determines the particular voting processes in which the individual is participating (if several voting processes are occurring at the same time); the options (choices) that may be presented to the individual, and so forth. The voter registration, described above, as well as the various actions and verifications needed to perform the voting, are carried out by a special supervisory body—e.g., an election commission.

In one aspect, the biometric data of the voter includes at least one of:

a fingerprint of the voter;

a palm pattern of the voter;

an iris pattern of the voter;

a photograph of the voter's face; and a voice recording of the voter.

For an illustrative example, after a voter arrives at the polling station and before the voting commences, the voter places his/her finger against a fingerprint scanner on an electronic balloting device. The fingerprint scanner scans the fingerprint, digitizes the image, and sends the digitized image of the fingerprint to the voter authenticator 110. Then, the voter authenticator 110, obtains (receives) the image of the fingerprint from the fingerprint scanner and matches the obtained image of the fingerprint with data in a voter database 111. If a match is found, the voter is authenticated. If no matching data is found in the voter database 111, the authentication is considered as failed and the voter is not allowed to cast the vote until a correction is made.

In another aspect, the electronic identifier of the voter is at least:

voter authentication data, such as a login and password;

an electronic key;

a QR code or a barcode with a unique voter identifier (UID); and an electronic digital signature of the voter.

For an illustrative example, when the voter arrives at the polling station, the voter provides a document corroborating the voter's identity (passport, driver's license, etc.). Upon successful presentation of the corroborating document, the voter receives a printed QR code (for example, by a device installed at the polling station and generating onetime QR codes) for activation of a voting device (i.e., for the ability to take part in the elections). In one aspect, the QR code may be a onetime code (i.e., it can only be used once). If, for whatever reason, it was not possible to use the QR code, another QR code may be generated for the voter, but it will not be possible to use several QR codes at the same time (due to the features of the electronic balloting system). Thus, the vote obtained with the use of only one QR code will be counted (such as the vote obtained earlier than others may be counted).

In yet another example, a person may register as a voter in advance at the election commission and receive, in advance, an electronic key (e.g., a device containing an electronic-digital signature of the voter). Then, the voter may subsequently participate in votes being conducted by that election commission, using the previously received electronic key.

In yet another aspect, the voter database 111 contains reference data of the voters corresponding to the data gathered from the voter during authentication of the voter. For example, the voter database 111 may contain biometric reference data of the voter (fingerprints, iris pattern, etc.) previously provided by the voter to the election commission, or obtained by the election commission from government agencies (in the case of government elections). In one aspect, the voter authentication is performed based on this reference data—the biometric data obtained from the voter during the voting is compared with the biometric reference data.

In yet another aspect, the voter database 111 stores information used to make a decision as to whether a particular voter is entitled to participate in the voting, and if so, what voting entitlements are to be afforded to the voter. For example, if the election commission is conducting several different elections at the same time (such as all-Russia municipal elections), the information may indicate, for each voter from the voter database 111, precisely which municipal elections the voter can participate in by voting.

In one aspect, the electronic ballot generator 120 is designed to:

generate, for the indicated voter, an electronic ballot based on previously prepared voting information 121 while taking into account that the authentication is performed successfully; and provide, to the voter, access to the generated electronic ballot.

In one aspect, the electronic ballot is an electronic document containing voting information including at least one of: a voting topic, a voting date, all possible voting options, an option chosen by the voter (the electronic vote of the voter), a time at which the voter voted, and so forth.

In yet another aspect, the electronic ballot is presented to the voter in a visualized manner, e.g., via a display device. For example, the voter may vote with the use of an electronic balloting device having a sensory display on which the voting information and voting options are displayed. Then, the voter can select the necessary option on the screen and confirm his/her choice.

In yet another aspect, access to the generated electronic ballot is provided to the voter by means of a specialized software or an API, at least:

locally through special electronic balloting devices;

by means of an application installed and running on a mobile device of the voter or a stationary computer; and by means of a cloud service, access to which being provided with the aid of a browser.

For example, instead of a device for electronic voting, in one aspect, the voter may use their own mobile telephone. For instance, the voter: may visit an appropriate site or use a previously installed software, familiarize himself/herself with the voting information, possible voting options, etc., after which, select an option out of all the possible voting options presented, confirm the voter's choice, and the like. Then, after the voter's choice is confirmed, the electronic vote of the voter will be generated at the site or in the installed software and will be sent to the appropriate services for further analysis and counting.

In yet another aspect, the voter authenticator 110 and the electronic ballot generator 120 run on the same computing device within a single application.

In one aspect, the vote registrar device 130 is designed to:
gather data on a choice of the voter on the electronic ballot provided to the voter (hereinafter, the electronic vote of the voter); and
register the electronic vote of the voter in a database of votes cast 131.

Even though data on the choice of the voter and so forth is gathered by the vote registrar device 130, when generating the electronic vote of the voter, all of the information is anonymized, i.e., it is made impossible to determine a voter and for which candidate they voted, yet it will remain possible to distinguish two electronic votes of voters from each other (i.e., it is not possible to use the same electronic vote of a voter for a second time, or to substitute the electronic vote of one voter for the electronic vote of another voter).

In one aspect, a decentralized registry of records is used to store the registered and counted electronic vote of a voter.

For example, in one aspect, a blockchain technology may be used to store the registered and counted electronic vote of a voter, where each electronic vote of a voter represents a next block in a blockchain being generated.

In yet another aspect, the electronic vote of the voter is anonymized prior to registration. For example, the information about the voter may be removed entirely from the vote of the voter; or a hash may be generated in such a way that the vote of the voter could be identified (i.e., it would be possible to distinguish two electronic votes of a voter from each other), but the voter himself could not be identified. For example, the voter data may be used to calculate the MD5 (or SHA256 or some other hash sum meeting a predetermined requirement on a cryptographic strength of the algorithm of the calculated hash sum and distribution of values of the hash sum). Afterwards, the calculated MD5 or other hash sum is used as a unique voter identifier.

In one aspect, the election monitor 140 is designed to:
generate a deferred request to be presented to the voter to confirm the validity of the electronic vote of the voter;
gather from the voter a response to the generated deferred request; and
send the gathered response to the vote counter 160.

In one aspect, the deferred request to be presented (sent) to the voter comprises at least one of:
an email to be sent to the voter containing a link to confirm the choice made;
an SMS message or a push notification to be sent to the voter, the SMS message or the push notification containing a link or a number which can be used to confirm the choice made; and
a request to be sent to a specialized voting software installed on the voter's computing device (e.g., a mobile telephone or a desktop computer).

In yet another aspect, the deferred request to the voter is generated at least:
after passage of a predetermined time from the time of registration of the electronic vote of the voter; and upon a number of registered votes of the voters exceeding a predetermined threshold value.

In one example, after the voter has voted in the elections, the voter receives an email one hour later, the email containing a link the voter can follow to confirm or revoke the vote of the voter. If revoked, the vote cast by the voter will not be counted in the final tally. For example, if the email is received by a user who did not participate in the elections, the confirmation fails and the vote that is already cast is revoked.

In another example, the push notifications are sent out to the voters after every 100,000 votes are cast.

In one aspect, the remote vote registrar device 150 is designed to:
generate a physical copy (hardcopy) of the ballot filled out by the voter in the centralized ballot repository 151; and
send information about the result of the generation of the physical copy to the vote counter 160.

In one aspect, the physical copy of the ballot filled out by the voter comprises a printed list of voting options with an indication of the option that is chosen.

In yet another aspect, the remote vote registrar device 150 is a combination of a container for storage of papers (which may be a safe protected against cracking) and a printer, where the printer performs the printing of the filled-out ballot, and the container is a protected repository of the printed ballot. For instance, the remote vote registrar device 150 may be a device that includes a combination of a printer (a printing device) and a sealed ballot box.

For an illustrative example, the voter may vote outside their city, but after casting an electronic vote, the remote vote registrar device 150 installed at the polling station where the voter is registered may print out the ballot with the vote cast by the voter. Thus, a kind of two-factor authorization of the voter's vote occurs. That is, after the voting is finished, it is possible to check the correctness of the votes cast, correct the voting results, or declare the voting invalid.

In one aspect, the vote counter 160 is designed to count the voter's vote in a database of counted votes 161 when positive feedback is obtained from the voter and a confirmation is received from the remote vote registrar device 150.

Figure 2:
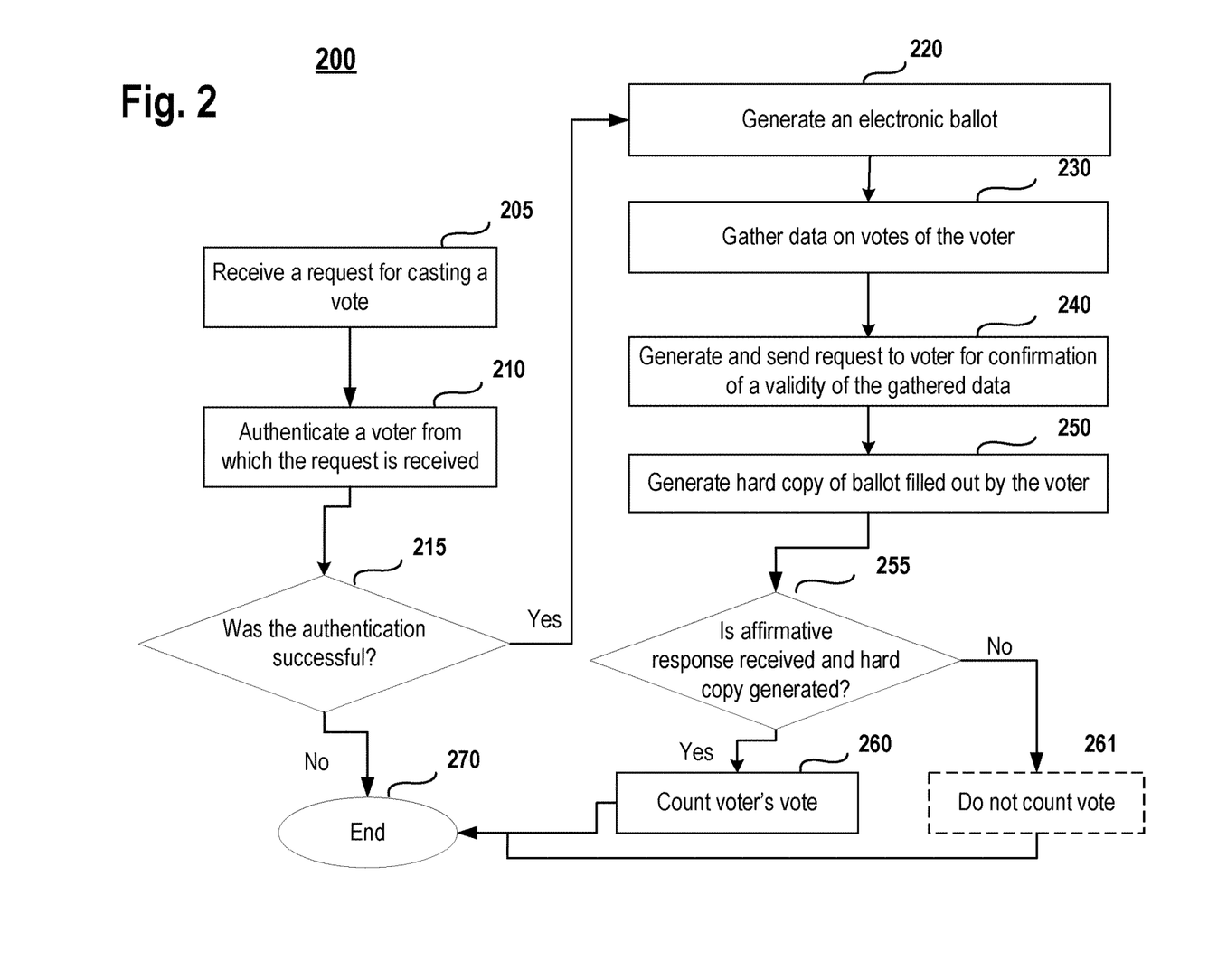
FIG. 2 illustrates an exemplary method for casting a vote in an electronic voting system in accordance with aspects of the present disclosure.

FIG. 2 illustrates an exemplary method 200 for casting a vote in an electronic voting system in accordance with aspects of the present disclosure.

In step 205, method 200 receives a request for casting a vote in an electronic voting system.

In step 210, method 200 authenticates a voter from whom the request for casting the vote is received. In other words, the voter who intends to vote is authenticated.

In one aspect, the authentication of the voter is performed based on at least one of: biometric data of the voter, and an electronic digital signature of the voter. The electronic digital signature of the voter is unique to the individual.

In step 215, method 200 determines whether the authentication was successful. When the voter is successfully authenticated, the method proceeds to step 220. Otherwise, the method returns to step 270.

In step 220, method 200 generates an electronic ballot based on voting information in accordance with the authentication of the voter. In one aspect, the voting information is previously prepared, i.e., prior to the session for casting of the vote.

In one aspect, the electronic ballot is an electronic document containing voting information, including the voting topic, the voting date, the possible voting options, the option chosen by the voter (i.e., the electronic vote of the particular voter), the time at which the voting is performed, and so forth.

In one aspect, the electronic ballot is presented to the voter in a visualized manner, e.g., via a display device. For example, the voter may vote with the use of an electronic balloting device having a sensory display on which the voting information and voting options are displayed.

In one aspect, access to the generated electronic ballot is provided to the voter by means of a specialized software or an API, at least:
  locally through special electronic balloting devices;
  by means of an application installed and running on a mobile device of the voter or a stationary computer; and
  by means of a cloud service, access to which being provided with the aid of a browser.

In one aspect, steps 210 and 220 may be performed on a same computing device within a single application.

In step 230, method 200 gathers data about electronic votes of the voter (voter's choices), wherein the electronic vote represents a choice of the voter on the electronic ballot. In other words, for the given voter, the electronic votes are gathered from among a number of choices presented to the voter.

In one aspect, a decentralized registry of records is used to store the registered and counted electronic vote of the voter.

In one aspect, the electronic vote of the voter is anonymized prior to the registration.

In one aspect, different votes may be combined such that the voter votes on multiple elections at the same time. For example, a first vote may be cast from among candidates for a first office, a second vote may be cast from among candidates for a second office, a third vote may be cast for a ballot issue (e.g., a budget approval or rejection, a new law being passed or being rejected), and so on.

In step 240, method 200 generates and sends at least one deferred request to the voter, the deferred request being generated for confirmation of a validity of the gathered data on the electronic vote of the voter.

In one aspect, the deferred request to be presented (sent) to the voter comprises at least one of:
  an email to be sent to the voter containing a link to confirm the choice made;
  an SMS message or a push notification to be sent to the voter, the SMS message or the push notification containing a link or a number which can be used to confirm the choice made; and
  a request to be sent to a specialized voting software installed on the voter's computing device (e.g., a mobile telephone or a desktop computer).

In one aspect, the sending of the deferred request to the voter for the confirmation of the validity of the gathered data about the electronic vote of the voter is performed upon an expiration of a predetermined time interval from a time of registration of the electronic vote of the voter.

In one aspect, the sending of the deferred request to the voter for the confirmation of the validity of the gathered data about the electronic vote of the voter is performed when a number of votes by registered voters is exceeded by a predetermined threshold value.

When a particular voter is voting for multiple elections that are running at the same time, in one aspect, a specific deferred request is generated for each election. In another aspect, the deferred request is generated for all elections, in which case, confirmation implies that the data is accurate for all the votes that the voter cast for the multiple elections that are being conducted simultaneously.

In step 250, method 200 generates a physical copy of the ballot filled out by the voter and places the generated physical copy in a centralized repository.

In one aspect, the physical copy of the ballot filled out by the voter includes: a printed listing of voting options among which the voter is to select by casting a vote and an indication of the chosen option from among the list of voting options.

In step 255, method 200 determines whether or not an affirmative response is received from the voter in response to the at least one deferred request sent to the voter for confirmation, and whether or not the physical copy of the ballot filled out by the voter is successfully generated. When the affirmative response is received and the physical copy is successfully generated (i.e., both conditions are met), method 200 proceeds to step 260. Otherwise, method 200 proceeds to step 261.

In general, once the user has submitted his/her vote, a number of steps are taken to determine whether or not to exclude the vote from the vote count. In one example, the vote may be due to forgery or may be submitted multiple times. In another example, the voter may be casting a vote for another candidate even though the vote does not involve casting multiple choices of candidates, e.g., first choice, second choice, etc. In yet another example, someone may cast a vote with inaccurate parameters for the vote. For instance, a vote may be cast for a fourth candidate, when there are only three choices presented to the voter. This may happen if an ID is assigned to each candidate and the voter casts his/her vote to an ID that is not assigned to any of the legitimate candidates. Thus, a number of steps are taken to make sure the vote is valid before it is added to the system.

In step 260, method 200 counts the vote of the voter and proceeds to step 270.

In optional step 261, method 200 skips counting the vote of the particular voter and proceeds to step 270. In one aspect, in step 261, method 200 may provide information regarding the uncounted vote to an election monitor (e.g., election monitor 140). In other words, in one aspect, the method further comprises: skipping the counting of the vote of the voter when the generation of the physical copy of the ballot is unsuccessful or an affirmative response is not received from the voter in response to the at least one deferred request sent for confirmation of the validity of the gathered data; and providing information regarding the uncounted vote to an election monitor.

In step 270, method 200 ends the process for casting of the vote for the voter and returns to step 205.

In one aspect, method 200 further comprises: storing the counted votes of the voter in a decentralized registry of records (i.e., a decentralized database of records).

In one aspect, method 200 further comprises: storing the cast (i.e., registered) votes of the voter in a decentralized registry of records (i.e., a decentralized database of records).

Figure 3:
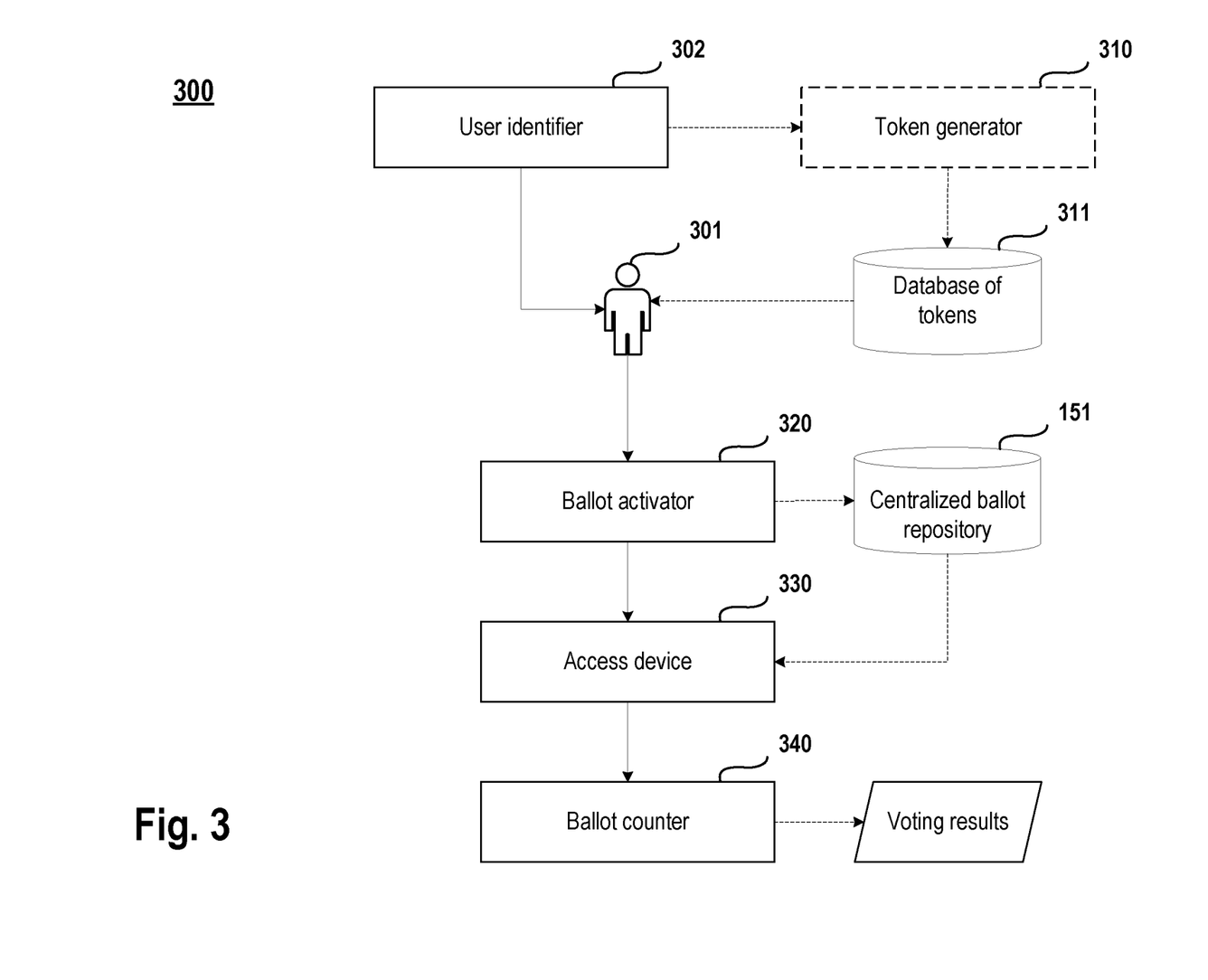
FIG. 3 illustrates a system for counting a ballot in an electronic voting system in accordance with aspects of the present disclosure.

FIG. 3 illustrates a system 300 for counting a ballot in an electronic voting system in accordance with aspects of the present disclosure. In one aspect, the system 300 comprises, a user 301, a user identifier 302, a centralized ballot repository 151, a token generator 310, a database of tokens 311, a ballot activator 320, an access device 330, and a ballot counter 340.

The token generator 310 is designed to generate a number of tokens. The tokens uniquely identify the actions of the user 301 during the electronic voting.

In one aspect, the actions of the user 301 comprise at least one of:

- an action for sending a request to receive information about the voting in which the user intends to participate;
- an action for sending a request to receive a ballot for filling out;
- an action for filling out a ballot (i.e., selecting from among possible voting options);
- an action for sending a request to count the ballot (or to complete the filling out of the ballot);
- an action for confirmation of the ballot as being correctly filled out (i.e., the correct choices being made); and
- an action for recalling the ballot (i.e., for requesting to exclude the choice made by the user 301 in the final voting results).

Thus, the user 301 may perform any of the above-indicated actions only if the user is confirmed by the selected token. This approach makes it possible to prevent unauthorized access to the ballot of the user 301.

In another aspect, the token is designed only for a onetime use in the electronic voting system. That is, the user 301 may participate with the aid of one token only in one voting (or several voting events conducted within a single general voting). As soon as the ballot of the user 301 is counted in the vote casting system within the electronic voting system (see also FIG. 1 and FIG. 2), the current token ceases to work and it becomes impossible to vote again with that same token (for example, the electronic voting system will not recognize or accept the token for subsequent attempts to vote).

It is noted that, overtime, tokens may become obsolete and may need to be refreshed. For example, if tokens that are generated over a given period of time may become unusable.

In one aspect, the token comprises at least one of:
- a QR code (a 2-dimensional barcode referred to as a Quick Response code);
- a barcode;
- a key character sequence; and
- an RFID tag (radio frequency identification tag).

In one aspect, the generation of the tokens is performed after the initiation of the voting, but prior to the immediate voting of the user 301. The number of tokens generated should be greater than the number of users 301 registered (and consequently taking part in the voting). Thus, any given user 301 taking part in the voting will have the ability to select one of the generated tokens. This, in turn, is one of the elements for depersonalization of the user 301 in the electronic voting system.

It should be noted that a single set of tokens is generated for all the users 301, from which each user 301 selects a token. Such an approach makes it possible to decouple the token from the user 301, thereby depersonalizing the token (the very same token may be chosen by one user 301 as well as another). The number of tokens that are generated should exceed the number of users 301 taking part in the voting, so that in the event that all the users 301 take part in the voting, even the last user will be able to select a token from the remaining tokens (at least two remaining tokens). Such an approach makes it possible to guarantee depersonalization of the token for any given user 301 taking part in the voting.

In one aspect, the tokens may be a printout on paper, plastic, or some other material, which will then be scanned by the access device 330.

For example, on the voting day prior to the opening of the polling stations, the printing of all the tokens supported by the electronic voting system is carried out. The tokens are unique and depersonalized, i.e., they are in no way related to the users 301 taking part in the current voting. The printed tokens are kept at the election commission and are made available to the users 301 after the users 301 are successfully identified with the aid of the user identifier 302. That is, the printed token is made available to a particular user 301 after determining: whether or not the particular user 301 has the right to take part in the current voting, and which voting options can be provided to the particular user 301. For example, the particular user 301 may be taking part in elections for a district administration of a city. Accordingly, the particular user 301 will be presented only with the choices of candidates for that city district. After the user 301 has undergone the identification and is allowed to take part in the voting, the user 301 selects one of the printed tokens and presents the selected token to the ballot activator 320 for scanning.

Thus, a visualization and depersonalization of the user 301 is performed when taking part in the voting. After identification and being able to access and select any token independently from all available tokens, the depersonalization of the user 301 occurs—thereby severing (breaking) the link between the data about the user 301 and the data about the choice of the user 301.

In one aspect, the tokens that are generated are kept in a database of tokens 311. The tokens kept in the database of tokens 311 may be used later for counting the tokens that are used by all of the users 301, and for identifying of attacks on the electronic voting system. In one aspect, in turn, the identification of attacks may affect whether or not the voting results are accepted.

In one aspect, the tokens selected for by the users 301 are kept in the database of tokens 311 for performing further controls on the voting and results of the election. For example, at the completion of the votes, the votes are counted. Then, the tokens are counted, whether or not the number of voters who voted corresponds to the number of tokens that are used (and saved) is determined, whether or not tokens have been duplicated is determined, and so forth. Even though the tokens that are generated are unique, a check for duplicate tokens is made in order to detect unauthorized interference during the course of the voting. In addition, besides the lawfully generated tokens (which are unique) third parties may generate their own tokens, matching up with the tokens generated legally, as described above. Moreover, if a user 301 attempts to vote at two polling stations with the same token, that attempt will also be detected, since the token used in the second voting will become a duplicate of itself as used in the first voting. It should be added that, in order to avoid the situation with repeat voting (as described above), each token can be assigned a predetermined "lifetime"—a period during which that token is valid (see below).

Thus, as described above, the method of the present disclosure provides additional controls over the electronic voting system and the correctness of the depersonalization of the users 301.

The ballot activator 320 is designed to activate the ballot of the user 301, i.e., for generation of the ballot of the user 301 and its unambiguous relationship to the token chosen by the user 301 after the generation of the tokens by the token generator 310. The token chosen by the user 301 may be referred to as "the active token". The user 301 uses the active token during the voting.

In one aspect, when the active token is presented by the user 301 to the ballot activator 320, the ballot is activated and access to the activated ballot is provided to the user 301.

For example, the user 301 choses one of the tokens for example, presented in the form of printed QR codes). After the user 301 has chosen one of the tokens, the user 301 presents the chosen token to the ballot activator 320.

In one aspect, the presentation of the token by the user 301 to the ballot activator 320 is performed at least by one of:
- scanning and subsequently recognizing an image of the token (i.e., converting the token from a physical medium to a digital form);
- reading information from an RFID tag; and
- recognizing a speech of the user 301 (in the event that the token is a key character sequence).

Since there is no direct link between the token generator 310, the user identifier 302 and the ballot activator 320, there is no transmittal of information about the user 301 or the link between the identification data of the user 301, the token, and the ballot that is generated. Thus, the method of the present disclosure provides yet another step of depersonalization of the user 301—thereby enhancing the anonymity of the voting/vote.

In one aspect, for the voting in which the user 301 is taking part using the given token, the method also determines which parameters are available to the user 301 based on voting information. For example, the determined parameters may include indications as to: which candidates the user 301 can vote for in the election, which local elections the user 301 can take part in, how much time is allotted to the user 301 for voting, and so forth.

In one aspect, the voting information includes at least:
- information encrypted in the token; and
- information saved in the electronic voting system and is related to the token (for example, when the token is generated by the token generator 310).

In one aspect, the electronic ballot generator 120 generates the ballot based on the voting information. (See also FIG. 1). Then, the token of the user 301 is linked to the particular generated ballot, so that only that user 301 can make use of that ballot.

In one aspect, that generated ballot can be duplicated on a physical medium (printed out as a sheet). Then, after the user 301 fills out the ballot (i.e., the user indicates his/her chosen option(s)), the ballot is accepted and analyzed by the ballot counter 340.

In one aspect, the activated ballot is saved in a central ballot repository 151, which is a decentralized data repository.

In one aspect, after the user 301 presents his/her token to the ballot activator 320, the token is kept in the central ballot repository 151, which operates on a blockchain technology. Information about a given token may be obtained afterwards from the central ballot repository 151 by the access device 330 and the ballot counter 340.

The access device 330 is designed to provide, to the user 301, access to the activated ballot for filling out the activated ballot based on the active token.

In one aspect, the presentation of the token by the user 301 to the access device 330 can be performed, in a similar manner it is presented to the activator 320. In one aspect, the presentation of the token to the access device 330 may be performed at least by:
- scanning and subsequent recognizing an image of the token (i.e., by converting the token from a physical medium to a digital form);
- reading information from an RFID tag; and
- recognizing a speech of the user 301 (e.g., in the event that the token is a key character sequence).

That is, after the user 301 has activated the ballot on the activator 320 using the chosen token, the activator 320 sends the ballot to the access device 330. The access device 330 provides, to the user 301, access to the ballot only after the user presents the selected token to the access device. That means basically the user 301 will have to present their token twice—the first time to the ballot activator 320, and the second time to the access device 330 prior to the voting.

In one aspect, the access device 330 is additionally designed to provide access to the user 301 to the activated ballot in the event that the time between activation of the ballot and access to the ballot does not exceed a previously determined time. In order to reduce the chance of gaining unauthorized access to the ballot of the user 301, a time limit may be introduced for voting in the electronic voting system. Thus, after the user 301 activates the ballot with the selected token, the ballot is associated not only with the selected token, but also with the time of activation of the ballot. In addition, the information about the association of the ballot with the token as well as with the time is recorded in the central repository of ballots 151. When the user presents the selected token to the access device 330, this information will be selected from the central repository of ballots 151 by the access device 330. If the time that passed between the presentation of the selected token to the access device 330 and the presentation of the same selected token to the activator 320 is greater than a previously determined threshold value, then access to the ballot will not be granted to the user 301.

The ballot counter 340 is designed to generate a record of the ballot filled out by the user 301 in the electronic voting system.

The operations of the ballot counter 340 are described in greater detail in conjunction with FIG. 1 as several components (or devices or modules) of the vote casting system in an electronic voting system. Referring to FIG. 1, the ballot counter 340 for counting the ballots of users 301 contains the vote registrar device 130, the election monitor 140, the remote vote registrar device 150, and the vote counter 160.

Suppose we consider an exemplary use of the system described above for counting the ballot of all users 301 in an electronic election (voting) system for a mayor of a city.

In the beginning, the election committee announces the holding of elections to the potential users (citizens), providing information about the candidates from whom the citizens will elect the future mayor, the dates of the elections, and the places of the elections. The electronic voting system presumes that the user 301 (voter) may vote not only at a local (municipal) polling station, but also at any other polling station connected to the electronic voting system (for example, in a neighboring city where elections for mayor will also be held that same day).

Immediately prior to the elections (for example, on the day of the voting), the election commission generates the tokens, the number of tokens generated being greater than the number of voters, so that each voter has an opportunity to select one of the tokens at the polling station. The tokens may be QR codes, printed on small sheets of paper and placed in a vessel (a common pool of tokens) from which each voter can select one of the sheets.

After a voter arrives at the polling station and undergoes identification (for example, by passport) of his/her right to participate in the elections (with the aid of the user identifier 302), the voter selects any token from the common pool of previously printed sheets with tokens. After the voter has been admitted to the polling and has selected a token, all of the voter's actions are depersonalized, since they are in no way connected to the personal data of the voter or the voter's identity. The only thing which can be said about the voter is that he/she was present at the polling station and took part in the voting.

After the voter has chosen a token (a sheet with the printed QR code), the voter scans the chosen token with the aid of the ballot activator 320. After the token has been scanned, an electronic ballot is generated by the ballot activator 320 for that voter, and the scanned token is linked to the generated ballot. Thus, all subsequent actions of the voter with that electronic ballot will be connected to the token chosen by the voter.

After the activation of the electronic ballot (the generation of the electronic ballot and the linking of the voter's token to the generated ballot), the ballot activator 320 establishes the "lifetime" of that electronic ballot of the voter (for example, 10 minutes), during which time the voter is able to vote (i.e., fill out the ballot using the access device 330).

After the activation of the electronic ballot, the voter goes to the place designated for the voting (a booth or some other means assuring privacy during the voting). There, with the aid of the access device 330, the voter is able to fill out the ballot (if their ballot has been activated and the time allotted for the voting has not run out). First of all, the voter scans the sheet with the QR code with the access device 330, as in the case with the ballot activator 320. If the scanned token is recognized as being activated and "valid", i.e., the time allotted for the voting has not yet expired, the voter is allowed to fill out the ballot.

After filling out the ballot, with the aid of the access device 330, the voter submits the filled ballot for later analysis and counting to the ballot counter 340.

Figure 4:
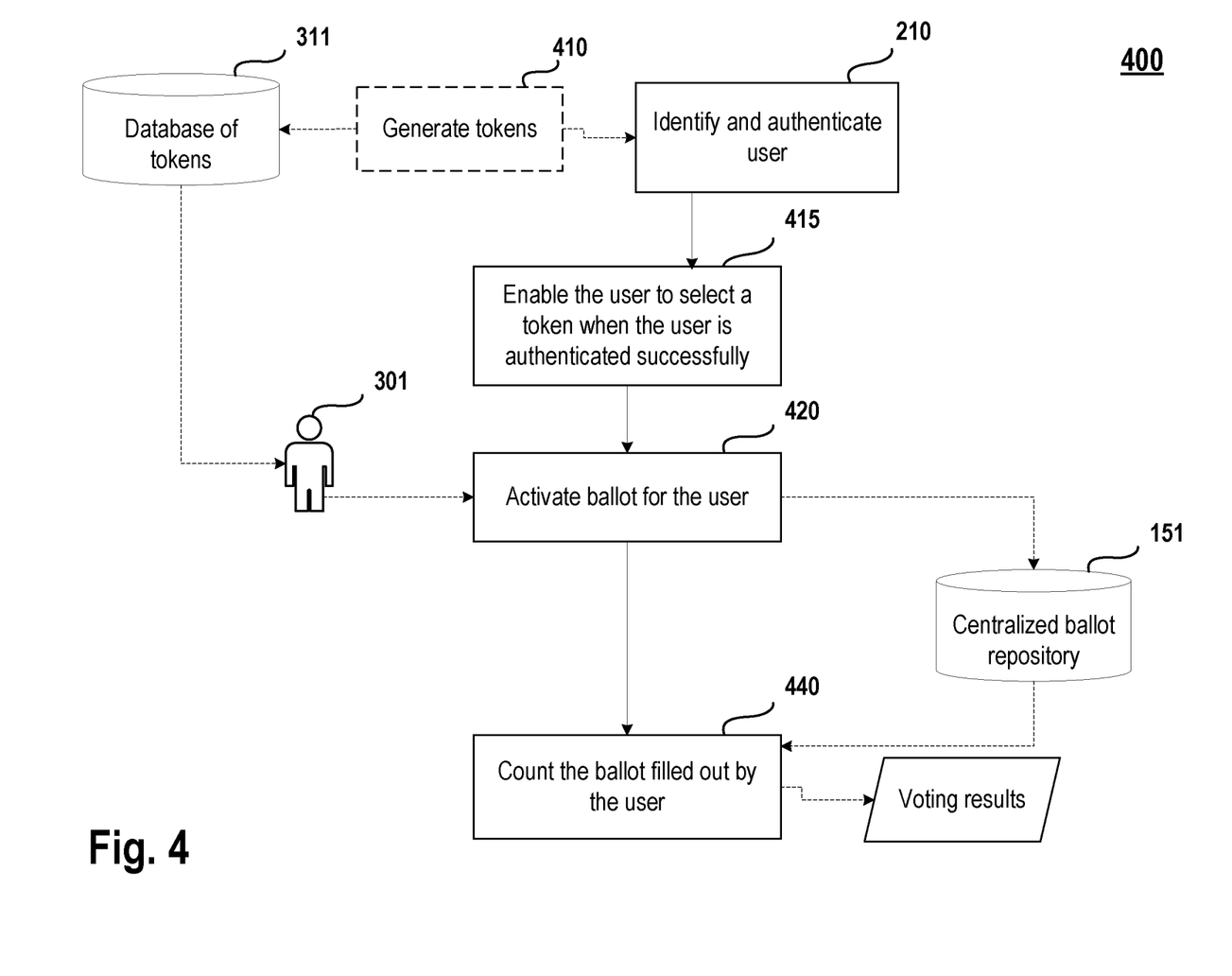
FIG. 4 illustrates an exemplary method for counting a ballot in an electronic voting system in accordance with aspects of the present disclosure.

FIG. 4 illustrates an exemplary method 400 for counting a ballot in an electronic voting system in accordance with aspects of the present disclosure. The structural diagram of the method of ballot counting in an electronic voting system involves a step 210 in which the user is identified, a step 410 in which tokens are generated, a step 420 in which the ballot is activated, and a step 440 in which the ballot of the user 301 is counted.

In step 410, by the token generator 310, method 400 generates a number of tokens, wherein the tokens unambiguously identify actions of a user 301 during an electronic voting. In one aspect, the number of tokens is at least two tokens, and the number of tokens exceeds a number of total users. Thus, the number of generated tokens exceeds the number of users to ensure that each user is able to select a token from at least two tokens. Then, the method proceeds to step 210.

In step 210, method 200 identifies and authenticates the user 301 (a first user). In other words, each user that appears to vote is authenticated prior to being allowed to cast a vote.

In step 415, when the user 301 is identified and authenticated successfully, method 400 enables the user to select a token from among the number of generated tokens.

In one aspect, the actions of the user 301 comprise at least one of:
an action for sending a request to receive information about the voting in which the user intends to participate;
an action for sending a request to receive a ballot for filling out;
an action for filling out a ballot (i.e., selecting from among possible voting options);
an action for sending a request to count the ballot (or to complete the filling out of the ballot);
an action for confirmation of the ballot as being correctly filled out (i.e., the correct choices being made); and
an action for recalling the ballot (i.e., for requesting to exclude the choice made by the user 301 in the final voting results).

In one aspect, the token is designed for use only for onetime use in the electronic voting system.

In one aspect, the token comprises at least one of:
a QR code;
a barcode;
a key character sequence; and
an RFID tag.

In one aspect, the generated tokens are stored in a database of tokens 311, wherein the tokens stored in the database of tokens are used for counting tokens used by all users 301, for performing analysis to identify attacks on the electronic voting system, and for determining, based on the analysis, whether or not a result of the voting is to be accepted.

In step 420, by the ballot activator 320, method 400 activates a ballot for the user 301. The activation of the ballot includes generating the ballot, unambiguously relating the token selected by the user to the ballot, and enabling the user to access the ballot. Hereinafter, the token chosen by the user 301 may be referred to as "the active token" as it is related to the active ballot. It is noted that an active ballot may become obsolete if not used within a predetermined time. For example, the user may vote via the active ballot within a half hour, 1-hour, of a time at which the ballot is activated.

In one aspect, the activation of the ballot by the ballot activator 320 is performed based on the user 301 presenting the token selected by the user to the ballot activator 320.

In one aspect, the providing of an access to the activated ballot, by an access device 330, to the user 301 is performed based on the user 301 presenting the active token to the access device 330.

In one aspect, the presentation, by the user 301, of the token selected by the user or the active token is performed at least by:
scanning and subsequently recognizing an image of the token (i.e., converting the token from a physical medium to a digital form);
reading information from an RFID tag;
recognizing a speech of the user 301 (in the event that the token is a key character sequence).

In one aspect, the activation of the ballot further includes determining voting parameters available for the user 301.

In one aspect, the voting parameters include at least one of: parameters for indicating which votes the user 301 is able to participate in using the token, a list of voting options (candidates) from which the user is to select a candidate, a length of time allotted for casting the vote, and so forth.

In one aspect, the voting parameters are determined based on voting information (see FIG. 2) which include at least:
information encrypted in the token; and
information saved in the electronic voting system and is related to the token (for example, when the tokens are generated by the token generator 310).

In one aspect, the ballot is generated and the token chosen by the user is linked to the generated ballot based on the voting information, wherein the linking of the generated ballot with the token is performed in a manner that enables only the user 301 (i.e., the particular user 301 that selected the token) is able to use the generated ballot.

In one aspect, the generated ballot is duplicated on a physical medium (printed out as a sheet), the user 301 fills out the ballot indicating selected options, and the filled out ballot is accepted and analyzed by the ballot counter 340.

In one aspect, the activated ballot is saved in a central ballot repository 151, which is a decentralized data repository.

In one aspect, the user 301 fills out the activated ballot based on the active token, i.e., in accordance with the voting parameters associated with the active token. The filled out ballot is then sent to the ballot counter to carry out step 440.

In one aspect, the user 301 presents the token to an access device 330 in order to access the activated ballot. That is, the user 301 accesses the activated ballot by presenting the token to the access device 330.

In one aspect, the presentation of the token to the access device 330, by the user 301, is performed, at least by one of:
scanning and subsequently recognizing an image of the token (i.e., converting the token from a physical medium to a digital form);
reading information from an RFID tag; and
recognizing a speech of the user 301 (in the event that the token is a key character sequence).

In one aspect, the user 301 is able to access the activated ballot when a time interval between an activation of the ballot and a time of the access to the activated ballot does not exceed a previously determined threshold.

In step 440, by the ballot counter 340, method 400 counts the ballot filled out by the user 301.

In one aspect, the method 400 generates a record of the counted ballot in the electronic voting system.

More specifically, the operations of step 440 are described in conjunction with FIG. 2 as several steps of the method 200 of casting a vote in an electronic voting system. The counting of the ballot of the user 301 involves a step 230 in which data is gathered on choice(s) of the user 301, a step 240 in which a deferred request of the user 301 is generated, a step 250 in which a physical copy is generated after the user 301 fills out the ballot, and a step 260 in which the vote of the user 301 is counted.

The technology described above can be used not only to carry out various kinds of electronic voting, but also in other areas, such as the conducting of surveys or, as noted in the field of technology, for producing ratings.

In one aspect, method 400 is used for conducting a survey function, where a questionnaire serves as the ballot and responses serve as the electronic votes. In this case, the user 301 is provided with a list containing, not the identifiers (including names) of candidates from whom the user 301 should make a choice, but rather a list containing answer variants (or rating variants), from which the user 301 should select at least one answer (or rating).

In general, when using the technology described above, the candidates, answer variants, ratings, and so forth are of the same nature and in no way differ for a particular user 301 when conducting the voting.

Figure 5:
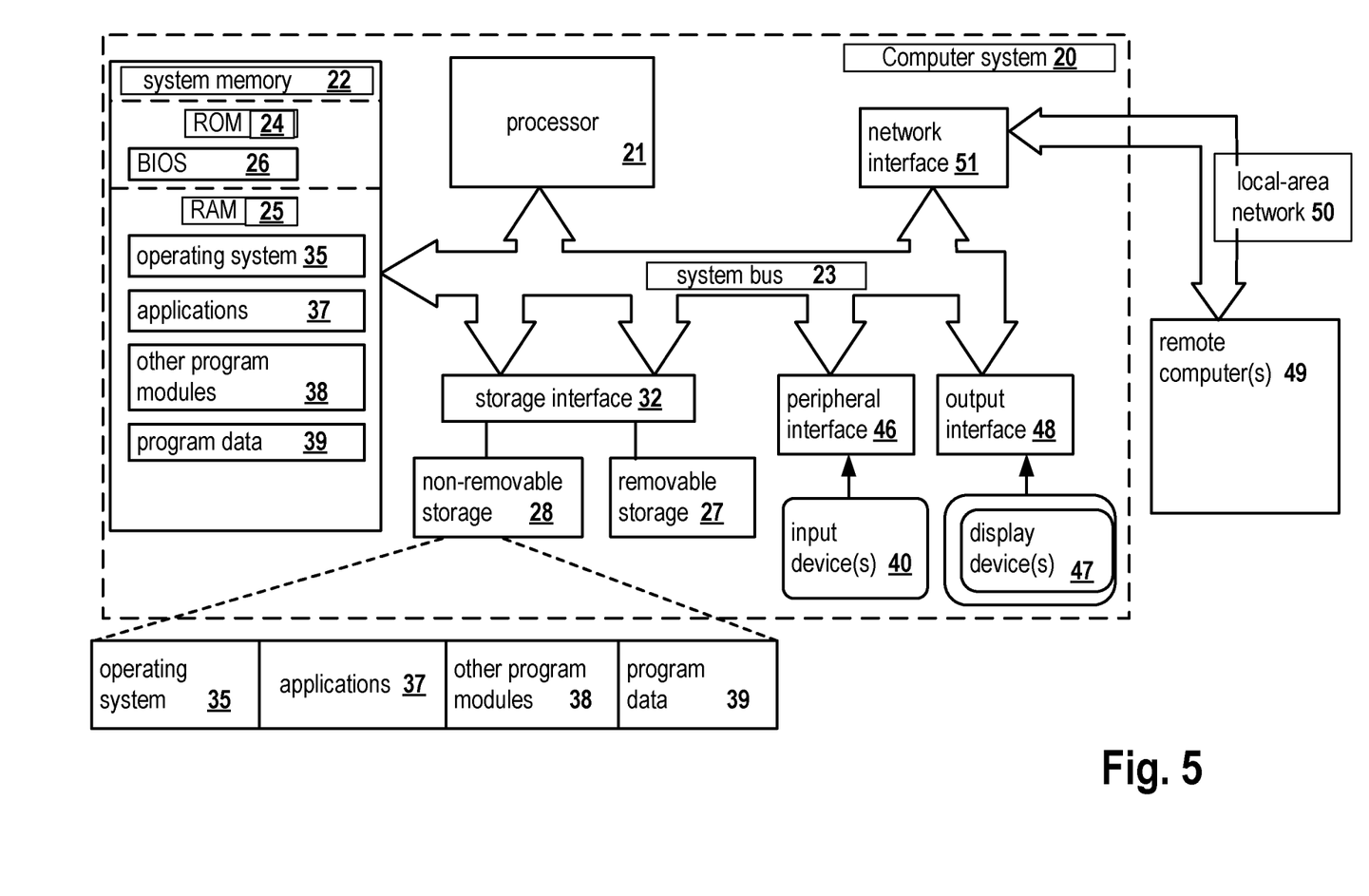
FIG. 5 presents an example of a general purpose computer system on which aspects of the present disclosure can be implemented.

FIG. 5 is a block diagram illustrating a computer system 20 on which aspects of systems and methods for counting a vote in an electronic voting system may be implemented in accordance with exemplary aspects. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for counting a ballot in an electronic voting system including a computing device, the method comprising:
generating, by a token generator of the system, a number of tokens, wherein every token unambiguously identifies actions of a user during an electronic voting;

when the user is identified and authenticated successfully, enabling the user to select a token from the number of tokens;

activating, by a ballot activator of the system, a ballot for the user, wherein activating includes:
determining voting parameters available for the user, the voting parameters including at least one of: parameters for indicating which votes the user is able to participate in using the token, and a length of time allotted for casting the vote,
generating the ballot, relating the token selected by the user to the ballot, and
enabling the user to access the ballot;

counting, by a ballot counter of the system, the ballot filled out by the user; and confirming a validity of the counted ballot filled out by the user, the confirmation being performed upon an expiration of a predetermined time interval from a time at which the ballot filled out by the user is counted or a number of counted votes exceeds a predetermined threshold value.

2. The method of claim 1, wherein the number of tokens is at least two and exceeds a number of total users.

3. The method of claim 1, further comprising:
generating a record of the counted ballot in the electronic voting system.

4. The method of claim 1, wherein the actions of the user comprise at least one of:
an action for sending a request to receive information about the voting in which the user intends to participate;
an action for sending a request to receive a ballot for filling out;
an action for filling out a ballot;
an action for sending a request to count the ballot after being filled out;
an action for confirmation of the ballot as being correctly filled out; and
an action for recalling the ballot.

5. The method of claim 1, wherein the token is designed only for onetime use in the electronic voting system.

6. The method of claim 1, wherein the token comprises at least one of:
a QR code;
a barcode;
a key character sequence; and
an RFID tag.

7. The method of claim 1, wherein the activation of the ballot is performed based on the user presenting the token selected by the user to the ballot activator.

8. The method of claim 1, wherein the voting parameters further include a list of voting options from which the user is to select a candidate.

9. The method of claim 8, wherein the voting parameters are determined based on voting information which include at least:
information encrypted in the token; and
information saved in the electronic voting system and is related to the token.

10. The method of claim 1, wherein the user is able to access the activated ballot based on the user presenting the selected token to an access device.

11. The method of claim 1, wherein the user is able to access the activated ballot when a time interval between the activation of the ballot and a time of the access to the activated ballot does not exceed a previously determined threshold.

12. A system for counting a ballot in an electronic voting system, comprising:
at least one processor of a computing device configured to:
generate, by a token generator of the system, a number of tokens, wherein every token unambiguously identifies actions of a user during an electronic voting;
when the user is identified and authenticated successfully, enable the user to select a token from the number of tokens;
activate, by a ballot activator of the system, a ballot for the user, wherein activating includes:
determining voting parameters available for the user, the voting parameters including at least one of: parameters for indicating which votes the user is able to participate in using the token, and a length of time allotted for casting the vote,
generating the ballot, relating the token selected by the user to the ballot, and
enabling the user to access the ballot;
count, by a ballot counter of the system, the ballot filled out by the user; and
confirm a validity of the counted ballot filled out by the user, the confirmation being performed upon an expiration of a predetermined time interval from a time at which the ballot filled out by the user is counted or a number of counted votes exceeds a predetermined threshold value.

13. The system of claim 12, wherein the number of tokens is at least two and exceeds a number of total users.

14. The system of claim 12, the processor is further configured to:
generate a record of the counted ballot in the electronic voting system.

15. The system of claim 12, wherein the actions of the user comprise at least one of:
an action for sending a request to receive information about the voting in which the user intends to participate;
an action for sending a request to receive a ballot for filling out;
an action for filling out a ballot;
an action for sending a request to count the ballot after being filled out;
an action for confirmation of the ballot as being correctly filled out; and
an action for recalling the ballot.

16. The system of claim 12, wherein the token is designed only for onetime use in the electronic voting system.

17. The system of claim 12, wherein the token comprises at least one of:
a QR code;
a barcode;
a key character sequence; and
an RFID tag.

18. The system of claim 12, wherein the activation of the ballot is performed based on the user presenting the token selected by the user to the ballot activator.

19. The system of claim 12, wherein the voting parameters further include a list of voting options from which the user is to select a candidate.

20. A non-transitory computer readable medium storing thereon computer executable instructions for counting a ballot in an electronic voting system, including instructions for:

generating, by a token generator of the system, a number of tokens, wherein every token unambiguously identifies actions of a user during an electronic voting;

when the user is identified and authenticated successfully, enabling the user to select a token from the number of tokens;

activating, by a ballot activator of the system, a ballot for the user, wherein activating includes:
  determining voting parameters available for the user, the voting parameters including at least one of: parameters for indicating which votes the user is able to participate in using the token, and a length of time allotted for casting the vote,
  generating the ballot, relating the token selected by the user to the ballot, and
  enabling the user to access the ballot;

counting, by a ballot counter of the system, the ballot filled out by the user; and confirming a validity of the counted ballot filled out by the user, the confirmation being performed upon an expiration of a predetermined time interval from a time at which the ballot filled out by the user is counted or a number of counted votes exceeds a predetermined threshold value.

* * * * *